Figure 1:
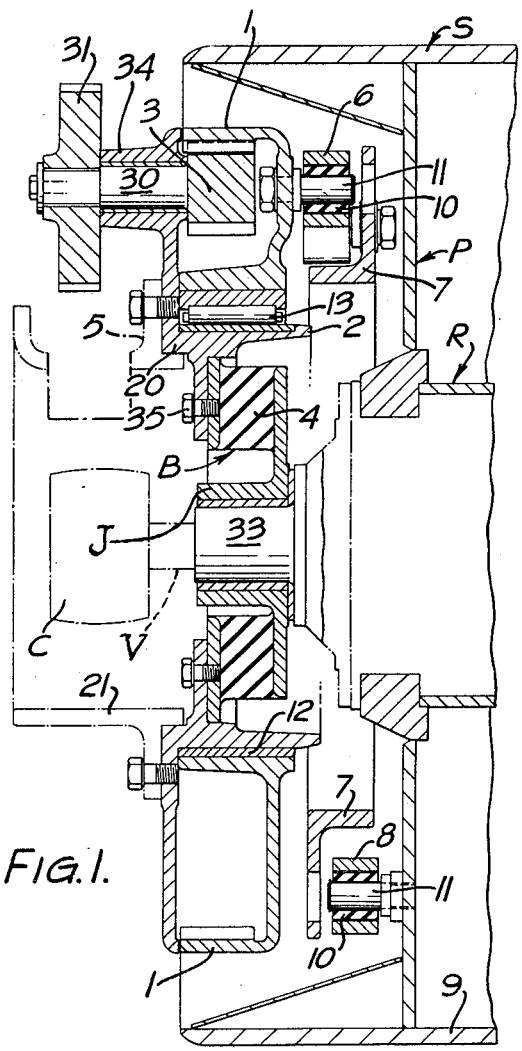

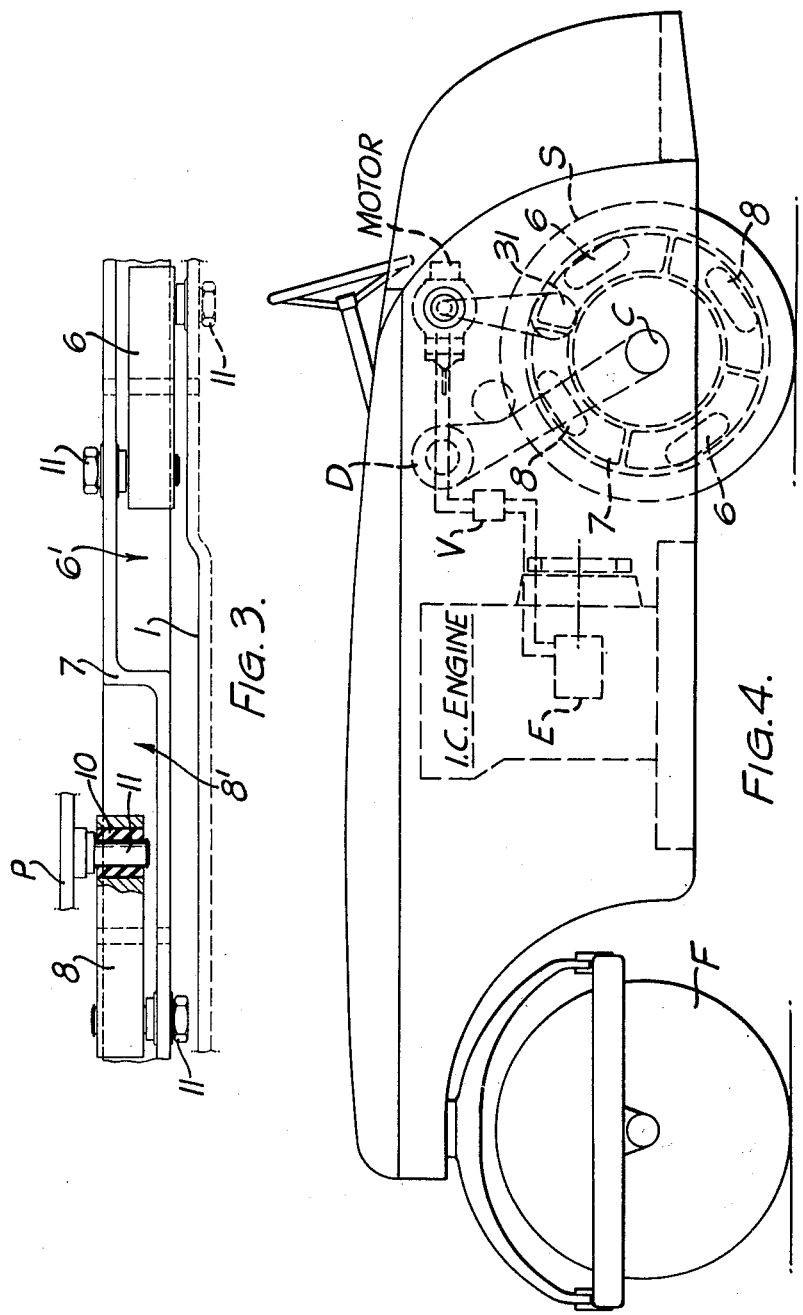

United States Patent Office 3,195,429
Patented July 20, 1965

3,195,429
VIBRATORY ROLLER HAVING IMPROVED DRIVING MEANS
Harold Raymond Cowley, Bath, Somerset, England, assignor to Stothert & Pitt, Limited, Bath, Somerset, England, a corporation of Great Britain
Filed Aug. 27, 1962, Ser. No. 219,605
Claims priority, application Great Britain, May 7, 1962, 17,452
7 Claims. (Cl. 94—50)

This invention relates to a vibratory roller and similar machines having an improved transmission coupling for the roll or other drive.

In a vibrating roller, with reference to which the invention is hereinafter described in detail, there are usually two independent drives to the main roll. One of these revolves the vibrator shaft. The other drives the roll to propel the machine and it is the latter with which this invention is concerned.

The connection between frame and roll of a vibrating roller is usually made through flexible units in such a way that the frame and all units mounted upon it are insulated from the vibration generated in the roll.

The roll is relatively free to move radially through limited distances relative to the frame. These movements are of three types:

(1) A movement of relatively small amplitude, which is that due to vibration.

(2) A vertical movement due to the roll lifting over obstructions or dropping into depressions in the surface being rolled. This movement of the roll takes place more quickly than the frame can follow.

(3) A horizontal movement due to the tendency of the frame to lag behind the roll according to the amount of tractive resistance; when reversing this movement will be doubled.

It will be appreciated that any normal drive connection between gearbox and roll must be capable of adjusting itself to suit the constantly changing centre distance of such a drive.

Thus when making use of a chain transmission in the drive to the roll it has hitherto been necessary to provide means to take up slack in the chain.

The present invention overcomes this difficulty in the following manner; normal transmission, i.e. belt, chain or gearing or a combination of these is used to transmit motion from the output shaft of a gearbox or other suitable unit to a drive member situated near one end of the roll and always revolving about the same, i.e. a constant centre under conditions of static loading but journalled on an extension of the frame.

From the above drive member connection to the roll is made through a floating intermediate ring in such a manner that torque is transmitted effectively regardless of any reasonable radial displacement of the roll relative to the frame.

According to the present invention a drive transmission for a vibratory roller or similar machine comprises a drive member journalled to rotate about a fixed centre on the roller frame and an intermediate ring part mechanically coupled to the drive member and the roll by connections which permit of relative displacement in all directions in a vertical plane of the roll to the drive member and vice versa.

Preferably the connections are made by at least two pairs of links, the link in each pair being located diametrically opposite to each other. The ring part may consist of an annular plate, which is of L-section to increase strength, the links being pivotally connected at one end to diametrically opposite studs which project from opposite sides of the plate, so that one pair of links is on one side, and the other pair on the other side to ensure balance.

At their other ends the links are pivotally anchored respectively to the drive member and to an end plate or disc of the roll.

Figure 2:
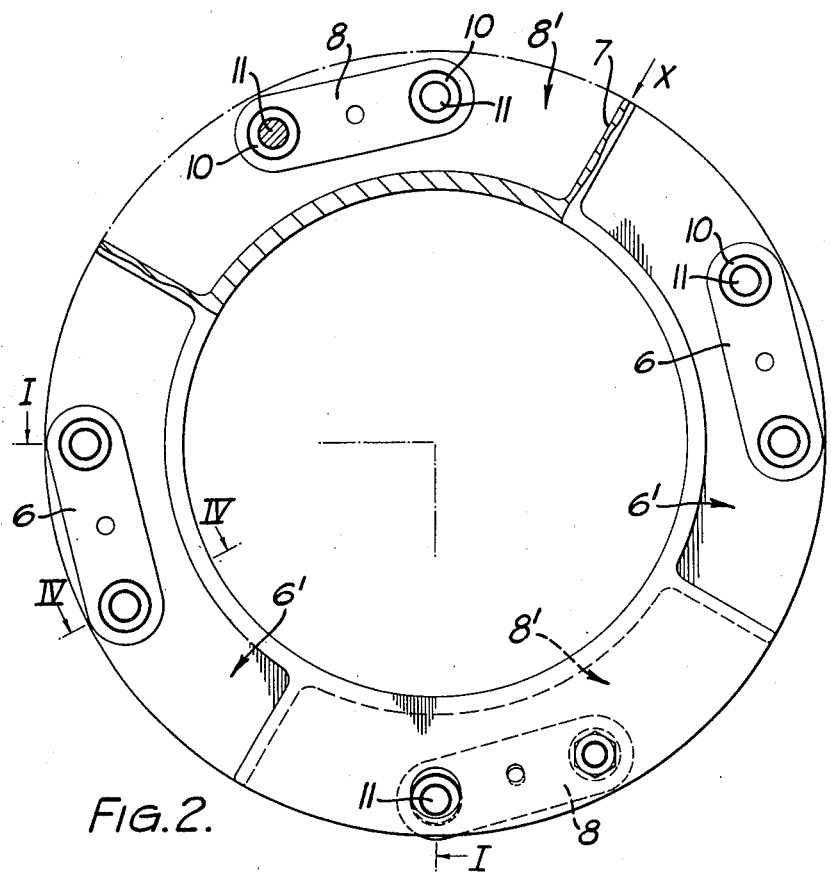

The invention is illustrated in the accompanying drawings in which:

FIGURE 1 is a part vertical section of one end of the vibratory roll including part of the roller frame fitted with a transmission coupling in accordance with a preferred embodiment of the invention, the section of the coupling ring being on the line I—I of FIGURE 2, FIGURE 2 is an elevation showing the coupling ring and links separately, FIGURE 3 is a developed view in the direction of arrow X of FIGURE 2, FIGURE 4 is an elevation of a twin-roll roller incorporating a transmission coupling for the vibrating roll drive in accordance with the invention.

Referring first to FIGURE 4, the vibrating roller comprises a front dead weight roll F and a rear vibratory roll S, the roll shell being indicated at 9. Drive is from an internal combustion engine through hydraulic equipment giving an infinitely variable speed both forward and reverse up to 5 m.p.h., the final drive to the roll S being through the transmission coupling of this invention. Drive from the engine is conveniently through belts to a hydraulic pump E and thence through fluid transmission lines via a valve V to a hydraulic motor. The hydraulic motor drives the vibratory shaft, a part of which is shown at V, through a vibrator bevel box D, from which the drive is to a pulley C on the outer end of the vibratory shaft.

The shell 9 of the vibratory roll S is attached by end plates P to a central core R within which the vibratory shaft is housed.

Referring now to FIGURES 1–3, the flexible mounting is provided by an annular block B or a series of blocks bonded on one face to a flange bearing J which journals the roller end spigot 33 and on their other face to a ring secured by studs 35 to an inner radial flange on a hub plate 20, on which is a boss 34 having a bore to accommodate a bearing for a spindle 30. The hub plate 20 in turn is secured by studs to a flange on a bridge plate 21 carried by and in effect being part of the roller frame, the bridge plate 21 having a circumferential slot to receive the drive belt to pulley C.

Drive from the hydraulic motor is by means of a chain transmission to an operating element, as shown a sprocket 31 on one end of a spindle 30 fast on the inner end of which is a drive pinion 3.

Drive from the pinion 3 is to a drive member in the form of an internally toothed gear wheel 1 which surrounds the horizontal axis of rotation of the roll S and is mounted to rotate on a journal provided by an axial flange 2 forming part of the hub plate 20, the gear wheel 1 being fitted with an anti-friction bearing in the form of a bush 12 or needle rollers 13. It will be seen that the journal 2 is accommodated between the flexible mounting 4 and the flange 5 of the bridge plate 21.

The transmission coupling consists essentially of a floating intermediate ring plate 7 surrounding the axis of rotation of the roll S and being mechanically connected to the gear wheel 1 by means of a pair of links 6 which are arranged diametrically opposite to each other. At right angles to the links 6 is another pair of diametrically opposed links 8 by which the ring plate 7 is connected to the end plate P of the roll shell 9. The ring plate 7 in effect operates as a floating ring between the roll and roller frame in such a manner that torque is transmitted effectively regardless of any reasonable displacement of the roll relative to the frame as permitted by the links.

As is more clearly shown in FIGURE 2, the ring plate 7 is for convenience pocketed on alternate sides to accommodate the links 6 and 8 respectively. Thus it is divided into four pockets, two pockets 6' facing to one side and two pockets 8' facing to the other side. Each of the four links 6—6, 8—8 is fitted with two rubber bonded bushes 10, one at each end which fit on to pins 11, the pins 11 in turn being anchored at their inner ends to the ring plate 7 and at their outer ends respectively to the gear wheel 1 and end plate P of the roll S.

In operation pinion 3, i.e. the drive member, is driven from the prime mover by gear reduction and chain or simple gear reduction. Pinion 3 drives gear wheel 1 which drives ring 7 through links 6, the ring 7 driving roll S through links 8.

Due to flexible mounting deflection, the roll centre will not always be on the centreline of the gear wheel 1 which is positioned at the centreline of the roll under the static deflection due to weight of the machine. Any deviations of the roll centre from the gear wheel centre are accommodated by angular movement of the links 6 and 8. Roll S and ring 7 are each capable of independent radial deflections which are of necessity always at right angles to one another and are governed by the disposition of links 6 and 8. Hence the roll can move freely in any radial direction relative to the gear wheel 1.

*Advantages over other known systems*

(1) It enables a smooth tractive effort to be applied to the roll without speed fluctuation as experienced with arrangements embodying expensive spring loaded tensioning gear.

(2) All load due to the traction drive is removed from the flexible mountings 4 which are free to act only as vibration insulators with greater efficiency and less stress.

(3) The final reduction gear 1 is not attached directly to the roll and wear on the gears, resulting from vibration, is eliminated by virtue of the complete insulation provided by the mountings.

(4) Lubrication problems on slow moving traction chains are eliminated. If chains are used they can more easily be completely cased and oil lubricated.

(5) Elaborate protection of the drive from entry of stones and other material is unnecessary as the gear and its support form a totally enclosed case. The drive member 1 is of channel section, the edges of the channel contacting the hub plate 20 so that the pinion 3 and the internal gear teeth of the drive member 1 are enclosed by the drive member and the hub plate.

What is claimed is:

1. In a vibratory roller construction of the class wherein a roll is mounted for rotation about a horizontal axis by journal means mounted on a frame by resilient means, and the roll is rotated by an operating element journalled on said frame, the roll being subjected to shock and vibration in addition to being rotated: the improvement comprising means for transmitting drive from said operating element to said roll including a drive member surrounding the roll axis and being mounted for rotation, an intermediate ring surrounding said roll axis, and mechanical connections between said intermediate ring and said roll and drive member respectively for transmitting rotary drive from said drive member through said intermediate ring to said roll and for enabling displacement of said roll in a vertical plane relative to said drive member.

2. A construction according to claim 1 in which said connections between said intermediate ring and said drive member and roll respectively are constituted by pairs of links, the links of each pair being diametrically opposite one another.

3. A construction according to claim 2 in which the pairs of links connecting the intermediate ring to the drive member and to the roll respectively are on opposite sides of said intermediate ring.

4. A construction according to claim 1 in which said connections between said intermediate ring and said drive member and roll respectively comprise links all pivotally connected to said intermediate ring and respectively pivotally connected to said drive member and to said roll, at least certain of the pivotal connections including resilient bush means.

5. A construction according to claim 4 in which said intermediate ring comprises an annular plate formed on opposite sides with pockets accommodating said links and the pivotal connections of the links to said intermediate ring.

6. A construction according to claim 1 in which said drive member comprises an internally toothed gear journalled on said frame.

7. A construction according to claim 1 in which a hub plate is carried by said frame and a pinion is journalled on and in which said hub plate, said drive member comprises an internally toothed gear meshing with said pinion and being of channel section, the edges of the channel contacting said hub plate, and said pinion being thereby enclosed by said drive member and said hub plate.

References Cited by the Examiner
UNITED STATES PATENTS

| | | | |
|---|---|---|---|
| 2,181,888 | 12/39 | Gustin | 64—12 |
| 2,297,400 | 9/42 | Friedrich | 74—411 |
| 2,630,692 | 3/53 | Naugler | 64—12 |
| 2,671,386 | 3/54 | Kerridge | 94—50 |
| 2,801,552 | 8/57 | Stubbings et al. | 74—411 |
| 2,822,700 | 2/58 | Eunis | 74—411 |
| 2,858,681 | 11/58 | Smirl et al. | 64—12 |
| 2,883,874 | 4/59 | Bynum | 74—411 |
| 3,105,424 | 10/63 | Dion et al. | 94—50 |

FOREIGN PATENTS

| | | |
|---|---|---|
| 905,845 | 4/45 | France. |
| 779,588 | 7/57 | Great Britain. |

BROUGHTON G. DURHAM, *Primary Examiner.*